US011119606B2

(12) United States Patent
Shen

(10) Patent No.: US 11,119,606 B2
(45) Date of Patent: Sep. 14, 2021

(54) BACKGROUND CAPACITANCE COMPENSATION

(71) Applicant: SYNAPTICS INCORPORATED, San Jose, CA (US)

(72) Inventor: Guozhong Shen, San Jose, CA (US)

(73) Assignee: Synaptics Incorporated, San Jose, CA (US)

(*) Notice: Subject to any disclaimer, the term of this patent is extended or adjusted under 35 U.S.C. 154(b) by 0 days.

(21) Appl. No.: 16/904,384

(22) Filed: Jun. 17, 2020

(65) Prior Publication Data

US 2021/0055824 A1    Feb. 25, 2021

Related U.S. Application Data

(60) Provisional application No. 62/889,407, filed on Aug. 20, 2019.

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ......... G06F 3/041–0445; G06F 3/0418; G06F 3/044
See application file for complete search history.

(56) References Cited

U.S. PATENT DOCUMENTS

| 8,072,230 | B1 | 12/2011 | Seguine |
| 8,482,339 | B1* | 7/2013 | Giuroiu ................. H03H 11/54 327/513 |
| 8,766,950 | B1* | 7/2014 | Morein ............... G06F 3/04166 345/174 |
| 8,830,207 | B1 | 9/2014 | Joharapurkar et al. |
| 9,024,912 | B2 | 5/2015 | Atkinson et al. |
| 9,541,588 | B2 | 1/2017 | Bohannon et al. |
| 9,746,974 | B2* | 8/2017 | Ellis .................... G06F 3/04166 |
| 9,778,804 | B2 | 10/2017 | Liu et al. |
| 9,857,921 | B2 | 1/2018 | Pant et al. |
| 10,126,884 | B2* | 11/2018 | Schwartz ............. G06F 3/0418 |
| 10,126,900 | B2* | 11/2018 | Bohannon ............. G09G 5/003 |
| 10,671,214 | B2* | 6/2020 | Yang .................... G06F 3/0443 |
| 2008/0136792 | A1* | 6/2008 | Peng ................... G06F 3/04186 345/174 |
| 2008/0277171 | A1* | 11/2008 | Wright .................... G06F 3/042 178/18.06 |
| 2010/0060608 | A1* | 3/2010 | Yousefpor ............. G06F 3/0445 345/174 |
| 2010/0292945 | A1* | 11/2010 | Reynolds .......... G06F 3/041662 702/65 |

(Continued)

*Primary Examiner* — Amy Onyekaba
(74) *Attorney, Agent, or Firm* — Leydig, Voit & Mayer, Ltd.

(57) ABSTRACT

A processing system comprises sensor circuitry and a baseline correction mechanism. The sensor circuitry comprises a receiver channel having an input configured to acquire a resulting signal from a sensor electrode. A background capacitance is formed between the sensor electrode and a conductive element. The baseline correction mechanism is coupled to the input of the receiver channel. The baseline correction mechanism comprises a resistive element configured to be driven with a compensation signal to at least partially mitigate the background capacitance.

17 Claims, 5 Drawing Sheets

(56) References Cited

U.S. PATENT DOCUMENTS

| | | | |
|---|---|---|---|
| 2012/0229419 A1* | 9/2012 | Schwartz | G06F 3/0443 345/174 |
| 2014/0375600 A1* | 12/2014 | Pan | G06F 3/04182 345/174 |
| 2015/0015528 A1* | 1/2015 | Vandermeijden | G06F 3/0446 345/174 |
| 2015/0091846 A1* | 4/2015 | Small | G06F 3/04166 345/174 |
| 2015/0091850 A1* | 4/2015 | Morein | G06F 3/04166 345/174 |
| 2015/0115977 A1* | 4/2015 | Bohannon | G01R 35/005 324/601 |
| 2015/0331535 A1* | 11/2015 | Li | G06F 3/0445 348/174 |
| 2015/0378467 A1* | 12/2015 | Hoch | G06F 3/0443 345/174 |
| 2015/0378496 A1* | 12/2015 | Vandermeijden | G06F 3/0443 345/174 |
| 2016/0026295 A1* | 1/2016 | Ogirko | G06F 3/04166 345/174 |
| 2016/0313825 A1* | 10/2016 | Hotelling | G06F 3/0418 |
| 2016/0334902 A1* | 11/2016 | Li | G06F 3/0445 |
| 2016/0358003 A1* | 12/2016 | Shen | G06K 9/0002 |
| 2017/0061188 A1* | 3/2017 | Kremin | G06F 3/0418 |
| 2017/0249049 A1* | 8/2017 | Wang | G06F 3/0412 |
| 2017/0255295 A1* | 9/2017 | Tanemura | G06F 3/041662 |
| 2017/0364184 A1* | 12/2017 | Weinerth | G06F 3/0442 |
| 2017/0371451 A1* | 12/2017 | Ellis | G06F 3/04166 |
| 2018/0004317 A1* | 1/2018 | Bohannon | G06F 3/0418 |
| 2018/0143736 A1* | 5/2018 | Losh | G06F 3/0442 |
| 2018/0188845 A1* | 7/2018 | Bohannon | G06F 3/0446 |
| 2018/0196542 A1* | 7/2018 | Bohannon | G06F 3/0446 |
| 2018/0284917 A1* | 10/2018 | Bohannon | G09G 5/003 |
| 2018/0314379 A1* | 11/2018 | Shen | G06F 3/0446 |
| 2018/0364830 A1* | 12/2018 | Shepelev | G06F 3/04166 |
| 2019/0034027 A1* | 1/2019 | Bohannon | G06F 3/0418 |
| 2019/0034028 A1* | 1/2019 | Stevenson | G06F 3/04186 |
| 2019/0056823 A1* | 2/2019 | Stevenson | G06F 3/041662 |
| 2019/0064956 A1* | 2/2019 | Tanemura | G06F 3/04166 |
| 2019/0102004 A1* | 4/2019 | Krah | G06F 1/1643 |
| 2019/0102037 A1* | 4/2019 | Krah | G06F 3/0418 |
| 2019/0107917 A1* | 4/2019 | Bohannon | G06F 3/0418 |
| 2019/0163295 A1* | 5/2019 | Vandermeijden | G06F 3/0446 |
| 2020/0064948 A1* | 2/2020 | Chang | G06F 3/0448 |

* cited by examiner

BACKGROUND CAPACITANCE COMPENSATION

CROSS REFERENCE TO RELATED APPLICATIONS

This application claims the benefit of U.S. provisional patent application Ser. No. 62/889,407, filed Aug. 20, 2019, which is hereby incorporated herein by reference.

BACKGROUND

Field

The disclosure herein is generally related to electronic devices, and more specifically, to capacitive sensing devices.

Description of the Related Art

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook or desktop computers. Proximity sensor devices may also be used in smaller computing systems, such as touch screens integrated in cellular phones. Additionally, proximity sensor devices may be implemented as part of a multimedia information system of an automobile.

SUMMARY

In one embodiment, a processing system comprises sensor circuitry and a first baseline correction mechanism. The sensor circuitry comprises a first receiver channel having an input configured to acquire a first resulting signal from a first sensor electrode. A first background capacitance is formed between the first sensor electrode and a conductive element. The first baseline correction mechanism is coupled to the input of the first receiver channel. The first baseline correction mechanism comprises a first resistive element configured to be driven with a first compensation signal to at least partially mitigate the first background capacitance.

In one embodiment, an input device comprises a first sensor electrode, a conductive element, and a processing system. The processing system comprises sensor circuitry and a first baseline correction mechanism. The sensor circuitry comprises a first receiver channel having an input configured to acquire a first resulting signal from the first sensor electrode. A first background capacitance is formed between the first sensor electrode and the conductive element. The first baseline correction mechanism is coupled to the input of the first receiver channel. The first baseline correction mechanism comprises a first resistive element configured to be driven with a first compensation signal to at least partially mitigate the first background capacitance.

In one embodiment, a method for operating a sensing device comprises driving, during a first period, a resistive element of a first baseline correction mechanism with a first compensation signal to mitigate a background capacitance between a sensor electrode and a conductive element. The first baseline correction mechanism is coupled to an input of a receiver channel of sensor circuitry. The method further comprises acquiring, during the first period, a resulting signal from the sensor electrode with the receiver channel, and determining positional information for an input object based on the resulting signal.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

Figure 1:
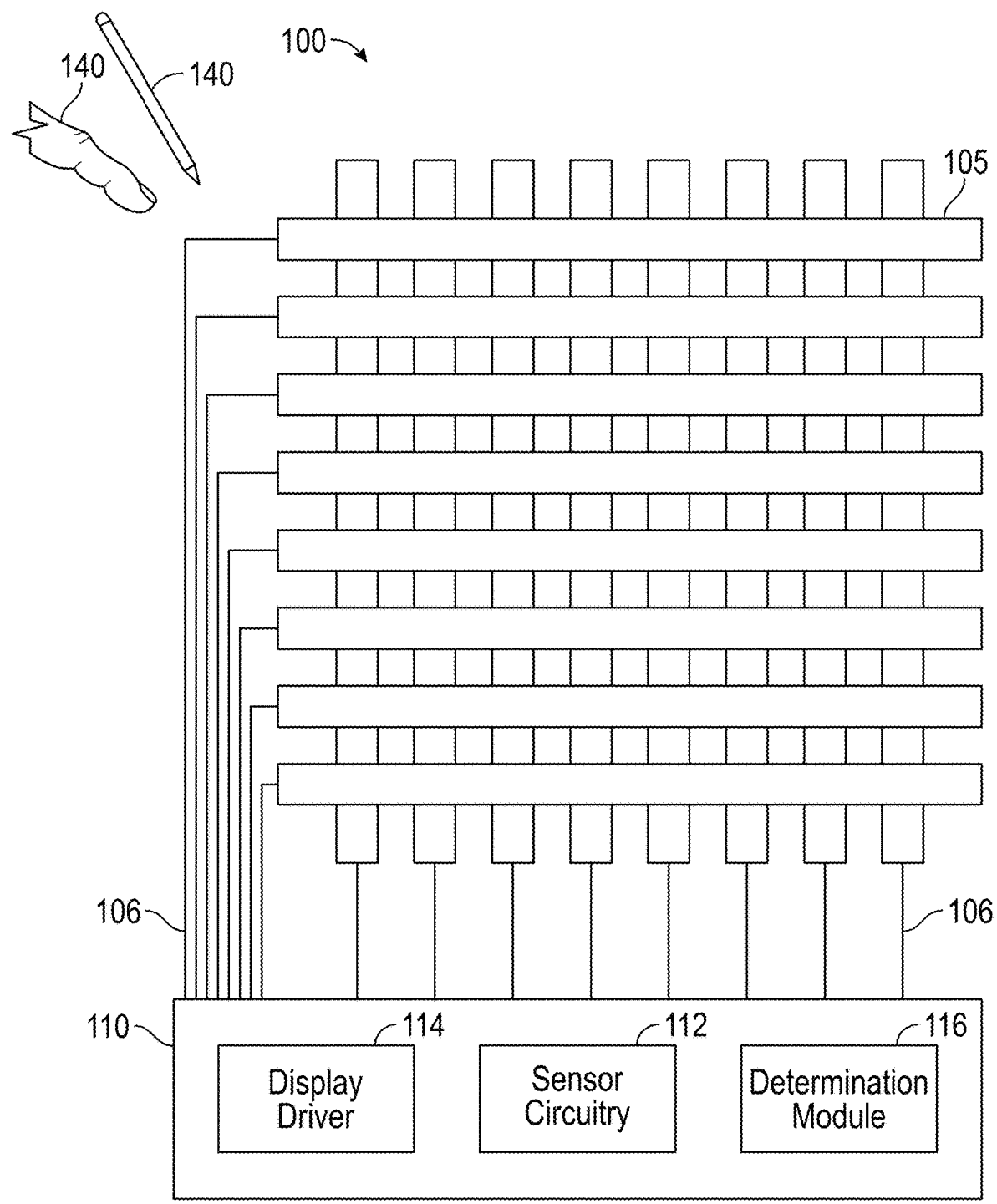
FIGS. 1 and 2 illustrate example input devices, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

The sensor electrodes of a sensing device capacitively couple to nearby conductive elements generating a background capacitance. In some applications, the nearby conductive elements are display electrodes of a display device. The background capacitance increases the total capacitance of the sensor electrodes, thus limiting the ability of sensor circuitry to detect relatively smaller changes in capacitance caused by the presence of an input object. For example, the background capacitance may saturate the sensor circuitry rendering smaller changes in capacitance caused by an input object undetectable. The background capacitance may be mitigated by driving a compensation current onto the receiver channels. As is described in the following, the compensation current is generated by driving a compensation resistance with a compensation voltage to mitigate background capacitance. Mitigating the background capacitance reduces the amount of background capacitance affecting the sensor electrodes, increasing the ability of the sensor circuitry to detect changes in capacitance caused by an input object.

FIG. 1 illustrates input device 100 configured to reduce capacitive coupling between sensor electrodes and display electrodes. The input device 100 may be configured to provide input to an electronic system (not shown). Some non-limiting examples of electronic systems include desktop computers, laptop computers, netbook computers, tablets, terminals, kiosks, cellular phones, automotive multimedia information centers, and internet of things (loT) devices, among others.

The input device 100 includes a processing system 110 and sensor electrodes 105. The processing system 110 operates the sensor electrodes 105 to detect one or more input objects 140 in a sensing region of the input device 100. Examples of input objects 140 include fingers, active pens and styli, as shown in FIG. 1. The sensing region of the input device 100 encompasses any space above, around, in and/or near the input device 100 in which the input device 100 is able to detect user input, e.g., user input provided by one or more input objects 140.

The sensor electrodes 105 are coupled to the processing system 110 via a plurality of traces 106. The exemplary pattern of the sensor electrodes 105 illustrated in FIG. 1 comprises sensor electrodes 105 disposed in a plurality of rows and columns. It is contemplated that the sensor electrodes 105 may be arranged in other patterns, such as polar arrays, repeating patterns, non-repeating patterns, non-uniform arrays, or other suitable arrangement. The sensor electrodes 105 may have a shape that is circular, rectangular, diamond, star, square, nonconvex, convex, nonconcave concave, or other suitable geometry.

The sensor electrodes 105 are disposed in one or more layers. In one embodiment, the sensor electrodes 105 may be disposed in a common layer. For example, the sensor electrodes 105 are disposed on a first side of a common substrate. In other embodiments, the sensor electrodes 105 are disposed in two or more layers. For example, a portion of the sensor electrodes 105 may be disposed on a first layer and another portion of the sensor electrodes may be disposed on a second layer. The first and second layers may be disposed on different sides of a common substrate, or disposed on different substrates. Further, one or more of the sensor electrodes 105 overlaps at least one other of the sensor electrodes 105.

The sensor electrodes 105 are comprised of a conductive material such as a metal mesh, indium tin oxide (ITO), or the like. Further, the sensor electrodes 105 are ohmically isolated from each other. That is, one or more insulators separate the sensor electrodes and prevent the sensor electrodes from electrically shorting.

The processing system 110 is configured to operate the sensor electrodes 105 to detect one or more input objects 140 in the sensing region of the input device 100. The processing system 110 fully or partially resides in one or more integrated circuit (IC) chips. For example, the processing system 110 may be completely disposed in a single IC chip. Alternatively, the processing system 110 may be disposed in multiple IC chips.

The sensor circuitry 112 is coupled to the sensor electrodes 105 via the routing traces 106. The sensor circuitry 112 is configured to drive the sensor electrodes 105 with sensing signals to detect one or more input objects 140 in the sensing region of the input device 100. The sensing signals include transcapacitive sensing signals and/or absolute capacitive sensing signals.

The sensor circuitry 112 includes digital and/or analog circuitry. For example, the sensor circuitry 112 comprises transmitter (or driver) circuitry configured to drive sensing signals onto the sensor electrodes 105 and receiver circuitry to receive resulting signals from the sensor electrodes 105. The receiver circuitry includes one or more receiver channels. Each of the receiver channels include analog and/or digital circuitry. For example, each of the receiver channels includes at least one or more of an operational amplifier, sample and hold circuitry, one or more filters, a digital-to-analog converter (DAC), and/or a demodulator, among others. FIGS. 3, 4, 6, and 7, detailed further below, illustrate exemplary receiver channels.

In one example, the sensor circuitry 112 drives a first one or more of the sensor electrodes 105 with a transcapacitive sensing signal and receives a resulting signal with a second one or more of the sensor electrodes 105 to operate the sensor electrodes 105 for transcapacitive sensing. Operating the sensor electrodes 105 for transcapacitive sensing detects changes in capacitive coupling between sensor electrodes driven with a transcapacitive sensing signal and sensor electrodes operated as receiver electrodes. The capacitive coupling may be reduced when an input object (e.g., the input object 140) coupled to ground approaches the sensor electrodes.

The transcapacitive sensing signal is a periodic or aperiodic signal that varies between two or more voltages. Further, the transcapacitive sensing signal has a frequency between 20 kHz and 1 MHz. In other embodiments, other frequencies may be utilized. For example frequencies less than 20 kHz and frequencies greater than 1 MHz may be utilized. The transcapacitive sensing signal may have a peak-to-peak amplitude in a range of about 1 V to about 10 V. However, in other embodiments, the transcapacitive sensing signal may have other peak-to-peak amplitudes. Additionally, the transcapacitive sensing signal may have a square waveform, a sinusoidal waveform, triangular waveform, a trapezoidal waveform, or a sawtooth waveform, among others.

In some embodiments, operating the sensor electrodes 105 to receive resulting signals comprises holding the sensor electrodes 105 at a substantially constant voltage or modulating the sensor electrodes 105 relative to the transcapacitive sensing signal. The resulting signals include effects corresponding to one or more transcapacitive sensing signals, and/or to one or more sources of environmental interference, e.g., other electromagnetic signals.

The sensor circuitry 112 additionally, or alternatively, operates the sensor electrodes 105 for absolute capacitive sensing by driving a first one or more of the sensor electrodes 105 with an absolute capacitive sensing signal and receiving a resulting signal with the driven sensor electrode(s). Operating the sensor electrodes 105 for absolute capacitive sensing detects changes in capacitive coupling between sensor electrodes driven with an absolute capacitive sensing signal and an input object (e.g., the input object 140). The capacitive coupling of the sensor electrodes 105 driven with the absolute capacitive sensing signal is altered when an input object (e.g., the input object 140) coupled to ground approaches the sensor electrodes.

The absolute capacitive sensing signal is a periodic or aperiodic signal that varies between two or more voltages. Further, the absolute capacitive sensing signal has a frequency between 20 kHz and 1 MHz. In other embodiments, other frequencies may be utilized. Additionally, the absolute capacitive sensing signal may have a square waveform, a sinusoidal waveform, triangular waveform, a trapezoidal waveform, or a sawtooth waveform, among others. The absolute capacitive sensing signal may have a peak-to-peak amplitude in a range of about 1 V to about 10 V. However, in other embodiments, the absolute capacitive sensing signal may have other peak-to-peak amplitudes. Driving the sensor electrodes 105 with an absolute capacitive sensing signal comprises modulating the sensor electrodes 105.

Resulting signals received while performing absolute capacitive sensing comprise effects corresponding to one or more absolute capacitive sensing signals, and/or to one or more sources of environmental interference, e.g., other electromagnetic signals. The absolute capacitive sensing signal may be the same or different from the transcapacitive sensing signal used to perform transcapacitive sensing.

The determination module 116 receives the resulting signals from the sensor circuitry 112 and processes the resulting signals to determine changes in capacitive coupling of the sensor electrodes 105. Processing the resulting signals includes removing a baseline measurement from the resulting signals, filtering the resulting signals, performing hysteresis on the resulting signals, and combining the resulting signals, among others, to determine the changes in capacitive coupling of the sensor electrodes 105. The determination module 116 utilizes the changes in capacitive coupling of the sensor electrodes 105 to determine positional information of one or more input objects (e.g., the input object 140). For example, a capacitive image may be generated from the measurements corresponding to the changes in capacitive coupling of the sensor electrodes 105, and the determination module 116 determines positional information for an input object 140 from the capacitive image. Additionally, or alternatively, the measurements of changes in capacitive coupling of the sensor electrodes 105 are compared to one or more thresholds.

The resulting signals utilized to detect the changes in capacitive coupling are received during a capacitive frame. A capacitive frame may correspond to one or more capacitive images. Multiple capacitive images may be acquired over multiple time periods, and differences between the images used to derive information about an input object 140 in the sensing region of the input device 100. For example, successive capacitive images acquired over successive periods of time can be used to track the motion(s) of one or more input objects entering, exiting, and within the sensing region.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

The processing system 110 may additionally include a display driver 114. The display driver 114 is coupled to the display electrodes (e.g., data lines 214 and/or a cathode electrode 222 of FIG. 2) of a display device (e.g., the display device 200 of FIG. 2). The display driver 114 drives display update signals (e.g., subpixel data signals and/or reference electrode signals) onto the display electrodes to update subpixels of the display device. The display driver 114 includes source drivers having amplifier circuitry that are configured to drive subpixel data signals onto the data lines.

Further, the display driver 114 communicates control signals to gate control circuitry of a display device to control driving of the gate lines (e.g., gate lines 216 of FIG. 2) to control the selection of the subpixels of the display device.

The display driver 114, the sensor circuitry 112, and the determination module 116 may be part of a common IC chip. Alternatively, one or more of the display driver 114, the sensor circuitry 112, and the determination module 116 may be part of a first IC chip and a second one or more of the display driver 114, the sensor circuitry 112, and the determination module 116 are part of a second IC chip.

Figure 2:
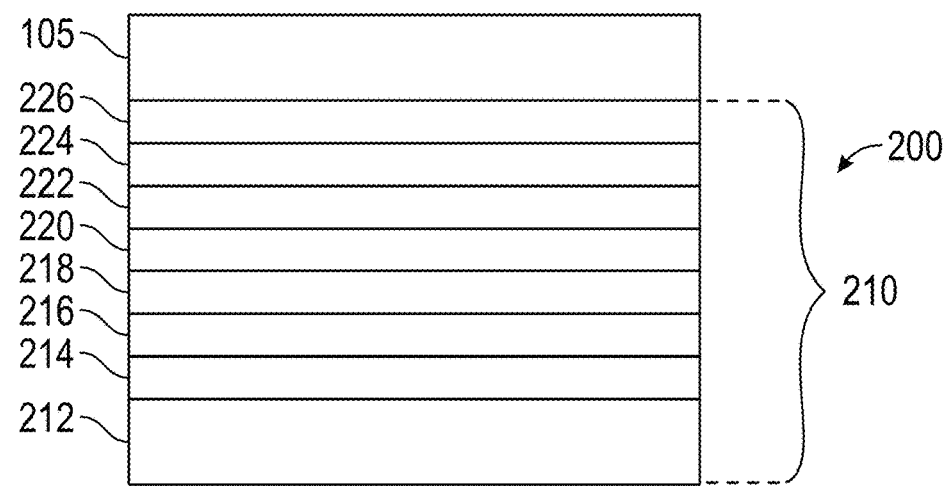

As illustrated in FIG. 2, the sensor electrodes 105 are disposed over a display panel 210 of the display device 200. In the example depicted in FIG. 2, the display panel 210 is an organic light emitting diode (OLED) display panel. However, in other embodiments, the display panel 210 may be configured as other display types (e.g., liquid crystal displays (LCDs) or the like). The display panel 210 includes display electrodes that are driven to update subpixel electrodes 218 of the display panel 210. The display electrodes include data lines 214 and gate lines 216. Additionally, the display electrodes may include emission control lines (not shown) configured to control the brightness of the subpixels of the display panel 210.

The data lines 214 are coupled to the display driver 114 and the gate lines 216 are coupled to the gate selection circuitry (not shown). Each of the subpixel electrodes 218 is coupled to one of the gate lines 216 and one of the data lines 214. Further, in one or more embodiments each of the subpixel electrodes 218 is coupled to an emission control line. The subpixel electrodes 218 may be referred to as anode electrodes in embodiments where the display device 200 is an OLED display device.

The data lines 214 and gate lines 216 are disposed in metal layers disposed on the substrate 212. The data lines 214 are disposed in a metal layer between the substrate 212 and the metal layer comprising the gate lines 216. Alternatively, the gate lines 216 are disposed in a metal layer between the substrate 212 and the data lines 214.

As is described above, the display driver 114 drives subpixel data signals onto the data lines 214 to update the subpixel electrodes 218. Gate select and gate deselect signals are driven onto the gate lines 216 by the gate selection circuitry to select (activate) and deselect (deactivate) corresponding subpixel electrodes 218 for updating.

The display panel 210 additionally includes organic material 220, a cathode electrode 222, display layers 224, and an encapsulation layer 226. The cathode electrode 222 is a sheet of resistive material that overlaps the subpixel electrodes 218. The cathode electrode 222 is coupled with and driven by the display driver 114 to supply a low impedance reference voltage. In embodiments where the display panel 210 is an LCD panel, the cathode electrode 222 is replaced with a common voltage (Vcom) electrode layer. Further, the cathode electrode 222 (or the Vcom electrode layer) may be referred to as a reference electrode layer.

The substrate 212 is a flexible substrate. Alternatively, the substrate 212 may be a rigid substrate. The display layers 224 include one or more polarizers and/or a color filter glass, among others. As illustrated, the sensor electrodes 105 are disposed on the encapsulation layer 226. In embodiments where the display device 200 comprises a lens, the sensor electrodes 105 may be disposed on the lens instead of the encapsulation layer 226. The lens may be disposed over the encapsulation layer 226 or included instead of the encapsulation layer 226.

The display driver 114 is configured to update the subpixel electrodes 218 to update an image displayed on the display panel 210 during display frames. The display frames may be updated, or refreshed, once about every 16 ms, generating a display refresh rate of about 60 Hz. In other embodiments, other display refresh rates may be employed. For example, the display refresh rate may be 90 Hz, 120 Hz, 140 Hz, or greater.

With further reference to FIG. 1, the sensor circuitry 112 is configured to drive the sensor electrodes for capacitive sensing during a capacitive frame at a capacitive frame rate. In one embodiment, during each capacitive frame each sensor electrode 105 is operated for absolute capacitive sensing. Further, each capacitive frame may include multiple periods during which different sensor electrodes 105 are operated for absolute capacitive sensing.

The "capacitive frame rate" (the rate at which successive capacitive images are acquired) may be the same or different from that of the "display frame rate" (the rate at which the display image is updated). The capacitive frame rate is an integer multiple of the display frame rate. In other embodiments, the capacitive frame rate is a fractional multiple of the display frame rate. Further, the capacitive frame rate is any fraction or multiple of the display frame rate. For example, the capacitive frame rate may be a rational fraction of the display rate (e.g., 1/2, 2/3, 1, 3/2, 2). The display frame rate changes while the capacitive frame rate remains constant. Alternatively, the display frame rate remains constant while the capacitive frame rate is increased or decreased. The capacitive frame rate may be unsynchronized from the display refresh rate or the capacitive frame rate may be a non-rational fraction of the display rate to minimize interference "beat frequencies" between the display updating and the input sensing.

Capacitive sensing (or input sensing) and display updating may occur during at least partially overlapping periods. For example, the sensor circuitry 112 is configured to operate the sensor electrodes 105 for capacitive sensing during a period overlapping with when the display driver 114 operates the gate lines 216 and data lines 214 to update an image displayed by the display panel 210. For example, updating the display panel 210 and operating the sensor electrodes 105 for capacitive sensing may be asynchronous with each other. Further, updating the display panel 210 and operating the sensor electrodes 105 for capacitive sensing may or may not be synchronized with each other.

Alternatively, or additionally, updating the display panel 210 and operating the sensor electrodes 105 for capacitive sensing may occur during non-overlapping periods. For example, updating the display panel 210 may occur during display update periods and operating the sensor electrodes 105 for capacitive sensing may occur during non-display update periods. The non-display update periods may be a blanking period that occurs between the last line of a display frame and the first line of a following display frame (e.g., during a vertical blanking period). Further, the non-display update periods may occur between display line update periods for two consecutive display lines of a display frame and are at least as long in time as the display line update period. In such embodiments, the non-display update period may be referred to as a long horizontal blanking period or long h-blanking period, where the blanking period occurs between two display line updating periods within a display frame and is at least as long as a display line update period.

As discussed above, as the sensor electrodes 105 are disposed over the display panel 210, the display electrodes (e.g., cathode electrode 222, data lines 214, and/or gate lines 216) of the display panel 210 undesirably capacitively couple with the sensor electrodes 105. This capacitive coupling maybe referred to as a background capacitance (e.g., $C_b$ shown in FIG. 3) and increases the capacitance of the sensor electrodes 105. Accordingly, high background capacitance limits the amount of change in capacitive coupling of the sensor electrodes 105 that the receiver channels of the sensor circuitry 112 are able to detect. However, driving a compensation current onto the inputs of the receiver channels of the sensor circuitry 112 mitigates the amount of background capacitance. Accordingly, compensation current driven onto the inputs of the receiver channels increases the ability of the receivers of the sensor circuitry to detect changes in capacitive coupling caused by the input objects 140.

Figure 3:
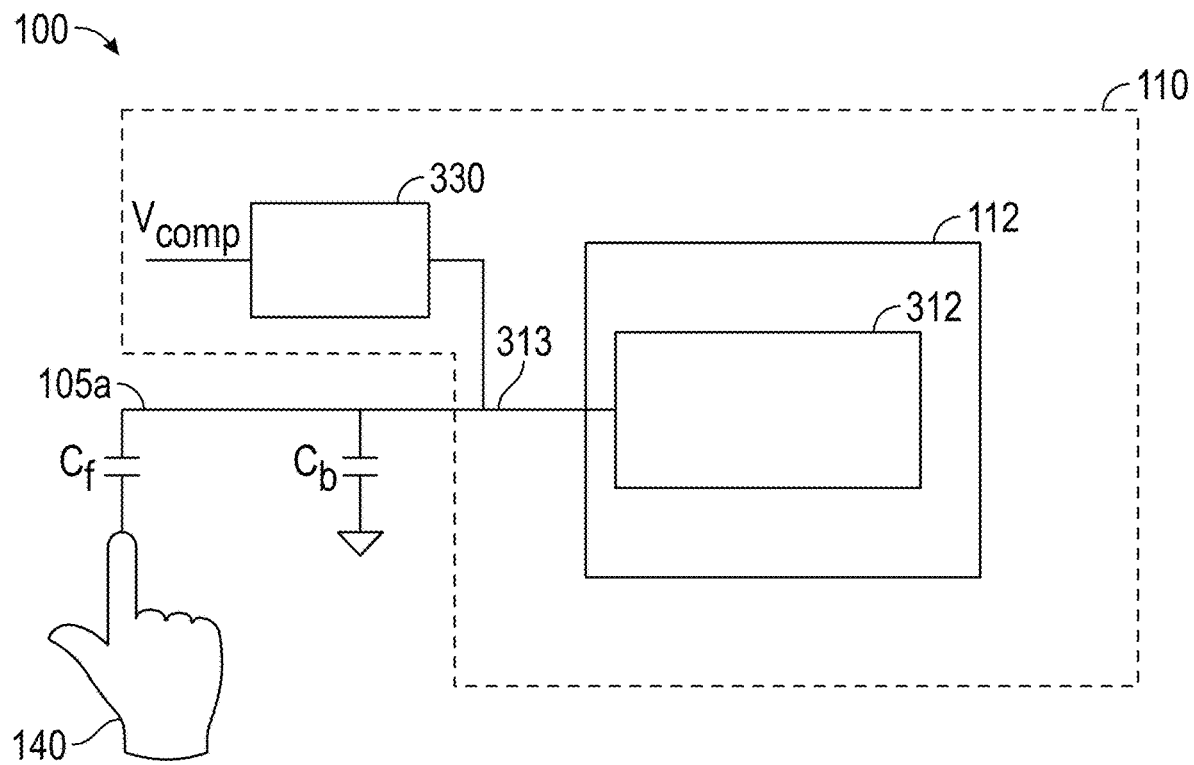
FIGS. 3 and 4 illustrate a portion of example input devices, according to one or more embodiments.

FIG. 3 illustrates a portion of the input device 100, according to one or more embodiments. The processing system 110 of the input device 100 is coupled to a sensor electrode 105a. The sensor electrode 105a is one of a plurality of sensor electrodes 105, such as illustrated in FIG. 1. The processing system 110 includes the baseline correction mechanism 330 and sensor circuitry 112 having a receiver channel 312. The sensor electrode 105a is coupled to an input 313 of a receiver channel 312 of the sensor circuitry 112. The receiver channel 312 acquires (receives) a resulting signal from the sensor electrode 105a. The receiver channel 312 may acquire the resulting signal in response to the sensor electrode 105a being modulated (or driven) with a sensing signal. The receiver channel 312 may modulate the sensor electrode 105a with the sensing signal or an external transmitter may modulate the sensor electrode 105a with the sensing signal. While the embodiment of FIG. 3 depicts a single receiver channel 312 of the sensor circuitry 112, in other embodiments, the sensor circuitry 112 includes more than one receiver channel 312. For example, the sensor circuitry 112 includes a receiver channel for each sensor electrode 105 that is operated for capacitive sensing during a common time period.

The resulting signal may correspond to the amount of charge driven on the sensor electrode 105a to drive the sensor electrode 105a to the voltage of the sensing signal. A capacitance $C_f$ is formed between the input object 140 and the sensor electrode 105a. $C_f$ alters the capacitance of the sensor electrode 105a to free space, altering the amount of charge driven onto the sensor electrode 105a. Thus, by measuring the resulting signal, $C_f$ may be determined. Further, as $C_f$ varies, the amount of charge driven onto the sensor electrode 105a varies accordingly. $C_f$ may vary based on the distance (e.g., horizontal and/or vertical distance) between the sensor electrode 105a and the input object 140, the size of the input object 140, or both. For example, $C_f$ decreases as the distance between the input object 140 and the sensor electrode 105a increases, and increases as the distance between the input object 140 and the sensor electrode 105a decreases. Further, $C_f$ varies based on the size, shape, and/or layout of the sensor electrodes 105. For example, as the size of the input object 140 and/or the size of the sensor electrode 105a increases, $C_f$ increases.

The background capacitance $C_b$ is formed between the sensor electrode 105a and the one or more proximate conductive elements. For example, $C_b$ is formed between the sensor electrode 105a and one or more display electrodes of the display panel 210. For example, $C_b$ is formed between the sensor electrode 105a and a cathode electrode 222, one or more subpixel electrodes 218, one or more gate lines 216, and/or one or more data lines 214 in embodiments employing an OLED display device. In embodiments employing an LCD display device, $C_b$ is formed between a common voltage electrode, one or more subpixel electrodes, one or more gate lines, and/or one or more data lines of an LCD device. The capacitance value of $C_b$ may vary based on the distance between the sensor electrode 105a and the conductive element (e.g., a display electrode or other conductive element). For example, as the distance between the sensor electrodes 105 and the display electrodes increases, the capacitance value $C_b$ decreases.

The capacitance value of $C_b$ is greater than that of $C_f$. For example, $C_f$ may be about 0.5 pF for an input object (e.g., the input object 140) having a diameter of about 9 mm and $C_b$ may be about 500 pF. As such, $C_b$ may make it difficult to determine $C_f$ from a resulting signal. Further, $C_b$ increases the capacitance of sensor electrodes 105a, and in turn, the charge driven on the sensor electrode 105a during capacitive sensing is increased, which may result in saturating the circuitry of the receiver channel 312 and increasing the power required to drive the sensor electrode 105a.

Figure 4:
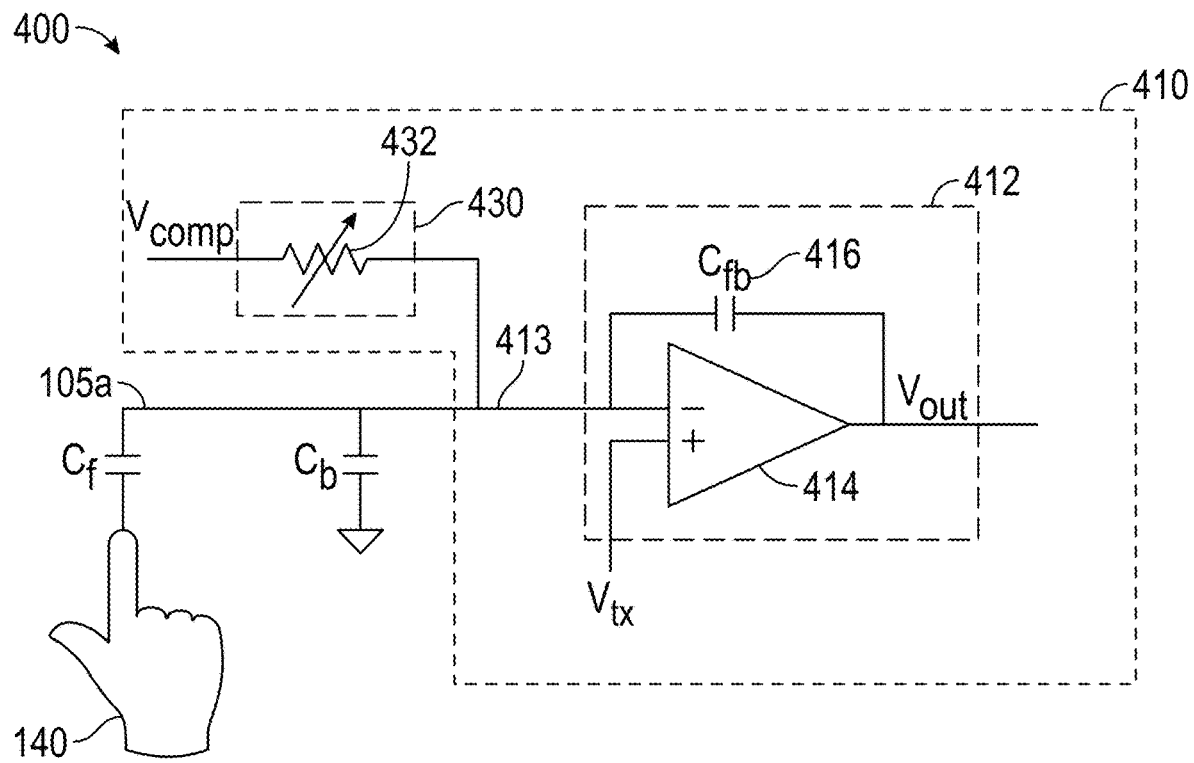

The baseline correction mechanism 330 is coupled to the input 313 of the receiver channel 312 and is utilized to offset the effects of $C_b$. For example, the baseline correction mechanism 330 is utilized to offset at least a portion of the effects of $C_b$ such that the effects of $C_b$ are at least partially mitigated. The baseline correction mechanism 330 subtracts charge from the input 313 of the receiver channel 312 to mitigate the effects of $C_b$ on the sensor electrode 105a. Mitigating $C_b$ reduces the total capacitance coupled to the receiver channel 312. Further, mitigating the $C_b$ reduces the amount of charge driven on the sensor electrode 105a to be less than the saturation voltage of the receiver channel 312, providing headroom for accurate capacitive sensing of the input object 140. Further, reducing $C_b$ increases the size of $C_f$ relative to $C_b$, making it easier for the sensor circuitry to measure value of $C_f$. With reference to FIG. 4, the baseline correction mechanism 330 may be utilized to offset the effects of $C_b$ such that the amount of charge driven on the sensor electrode 105a is less than the saturation voltage of the operational amplifier 414 of the receiver channel 312.

The baseline correction mechanism 330 includes one or more passive circuit components. For example, baseline correction mechanism 330 includes one or more resistive elements (e.g., the resistive, element 432 of FIG. 4). Further, the baseline correction mechanism 330 may additionally include one or more capacitive elements (as described below with reference to FIG. 7).

A different baseline correction mechanism 330 may be coupled to the input of each receiver channel of the sensor circuitry 112, Alternatively, a common baseline correction mechanism 330 may be coupled to the input of two or more receiver channels of the sensor circuitry 112.

In various embodiments, the baseline correction mechanism 330 is driven by a compensation signal, $V_{comp}$. $V_{comp}$ may be a modulated signal similar to that of the sensing signal (e.g., the transcapacitive, sensing signal and/or the absolute capacitive, sensing signal). $V_{comp}$ is provided by a driver of the processing system 110. Alternatively, $V_{comp}$ is provided by a driver external to the processing system 110. The frequency of $V_{comp}$ is substantially similar to the frequency of the sensing signal. For example, the frequency of $V_{comp}$ is within circuit tolerances of the frequency of the sensing signal. In one specific example, the frequency of $V_{comp}$ is ±5% of the frequency of the sensing signal. In some embodiments, the frequency of $V_{comp}$ is the same as the frequency of the sensing signal. The frequency of $V_{comp}$ may be in a range of about 20 kHz to about 1 MHz, $V_{comp}$ includes one or more of a sinusoidal waveform, square waveform, a trapezoid waveform, and a triangular waveform, among others. The sensing signal and $V_{comp}$ may have a common waveform shape. For example, the sensing signal and $V_{comp}$ may both have sinusoidal waveforms. Alternatively, the sensing signal may have a first waveform shape and $V_{comp}$ may have a second waveform shape different from the first. Further, $V_{comp}$ may have peak-to-peak amplitude similar to the peak-to-peak amplitude of the sensing signal. For example, the amplitude of $V_{comp}$ is within circuit tolerances of the peak-to-peak amplitude of the sensing signal. In one specific example, the peak-to-peak amplitude of $V_{comp}$ is ±5% of the peak-to-peak amplitude, of the sensing signal. Alternatively, the peak-to-peak amplitude of the $V_{comp}$ is greater than or less than the amplitude of the sensing signal. For example, the peak-to-peak amplitude of $V_{comp}$ is a multiple, of the peak-to-peak amplitude of the sensing signal. For example, $V_{comp}$ is M-times the peak-to-peak amplitude of the sensing signal, where M is greater than 1. Further, as is described in further detail in the following, the phase of $V_{comp}$ differs from the phase of the sensing signal.

FIG. 4 illustrates a portion of an input device 400, according to one or more embodiments. The input device 400 comprises the processing system 410 and the sensor electrode 105a. The processing system 410 is configured similar to that of the processing system 110, and may replace the processing system 110 in the input device 100. The processing system 410 includes the baseline correction mechanism 430 and a receiver channel 412 of sensor circuitry (e.g., the sensor circuitry 112). The receiver channel 412 includes an input 413, the operational amplifier 414, and the feedback capacitor $C_{fb}$. The input 413 corresponds to the inverting input of the operational amplifier 414. The sensing signal $V_{tx}$ is driven onto the non-inverting input of the operational amplifier such that the sensor electrode 105a is modulated. The operational amplifier 414 is configured to output a resulting signal $V_{out}$. $V_{out}$ corresponds to the amount of charge driven onto sensor electrode 105a when driven with $V_{tx}$. When an input object 140 and/or a conductive element are proximate the sensor electrode 105a, $V_{out}$ includes effects corresponding to $C_f$ and $C_b$.

Figure 5:
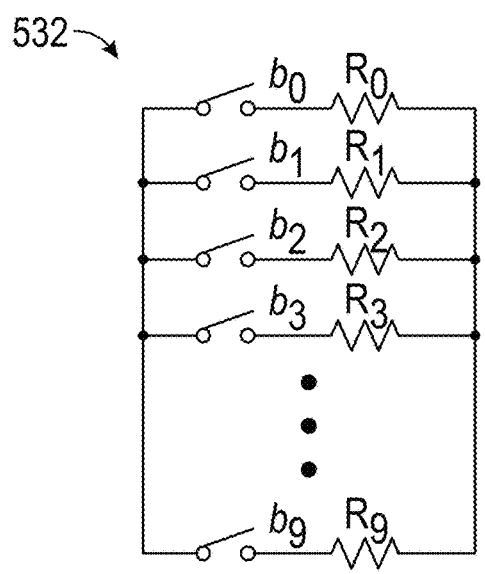
FIG. 5 illustrates an example resistive element, according to one or more embodiments.

The baseline correction mechanism 430 includes the resistive element 432 that is driven by $V_{comp}$. The resistive element 432 may be a variable resistive element having a variable resistance. The variable resistance may be provided by one or more variable resistors or a resistor ladder that functions as a resistor digital-to-analog converter (R-DAC). In one embodiment; the resistive element 432 is a 10-bit R-DAC as illustrated in FIG. 5. In other embodiments, the resistive element 432 may be an R-DAC less than a 10-bit R-DAC or greater than a 10-bit R-DAC.

The resistive element 432 has a resistance in a range of about 1000 ohms to about 5000 ohms. Alternatively, the resistance of the resistive element 432 may be less than about 1000 ohms or greater than about 5000 ohms.

One or more of the phase of $V_{comp}$, the frequency of $V_{comp}$, and the resistance value of the resistive element 432 is selected to compensate for $C_b$. $C_b$ is measured when Cr is zero (e.g., no input objects 140 within the sensing region of the input device 100), and the frequency of $V_{comp}$, and/or the resistance value of the resistive element 432 are adjusted to offset (e.g., mitigate) the effects of $C_b$ within $V_{out}$. For example, the frequency of $V_{comp}$, and/or the resistance value of the resistive element 432 may be adjusted until $V_{out}$ has a value of zero when Cr is zero. Alternatively, the frequency of $V_{comp}$, and/or the resistance value of the resistive element 432 may be adjusted until $V_{out}$ has a value less than a threshold value. The threshold value is greater than 0 and less than the saturation voltage of the operational amplifier 414. $C_b$ may be modeled instead of or in addition to being measured by observing $V_{out}$. In such embodiments, the frequency of $V_{comp}$, and/or the resistance value of the resistive element 432 are selected based on the modelled value of $C_b$. In one specific example, to compensate for a $C_b$ of about 500 pF, $V_{comp}$ has a frequency of about 200 kHz and the resistance value of the resistive element 432 is about 1600 ohms. However, in other embodiments, the frequency of $V_{comp}$ may be less than or greater than about 200 kHz and the resistance value of the resistance element 432 may be greater than or less than about 1600 ohms.

The phase of $V_{comp}$ differs from the phase of $V_{tx}$. $V_{comp}$ is phase delayed as compared to the sensing signal $V_{tx}$. The phase of $V_{comp}$ may be the opposite of the phase of the sensing signal $V_{tx}$. For example, $V_{out}$ generated based on $V_{tx}$ and not $V_{comp}$ (e.g., $V_{comp}$ is not driven), has a first phase and $V_{out}$ generated based on $V_{comp}$ and not $V_{tx}$. $V_{tx}$ is not driven) has a second phase opposite that of the first phase. The phase of the sensing signal $V_{tx}$ may be measured via the receiver channel 412. Alternatively, the phase of the sensing signal $V_{tx}$ is a parameter stored within the processing system 410 and is utilized to generate the phase of $V_{comp}$.

The following example is based on a sensor electrode having an idealized resistor-capacitor model for ease of explanation. However, the presented concepts are applicable to sensor electrodes having more complicated resistor-capacitor model. The relationship between the phase, frequency and/or peak-to-peak amplitude of $V_{comp}$ and the resistance value of the resistive element 432 is defined based on the following equations.

$V_{out}$ is defined as:

$$V_{out} = V_{Tx}\left[\frac{C_b}{C_{fb}} + 1\right] + \frac{V_{Tx} - V_{comp}}{RC_{fb}s}. \qquad \text{Equation 1}$$

$C_{fb}$ is the capacitance of the feedback capacitor 416 of the receiver channel 412. To compensate for the effects of $C_b$ within $V_{out}$, such that $V_{out}=0$ when $C_f$ is 0, the parameters of $V_{comp}$ may be derived from:

$V_{comp}=V_{Tx}[R_{comp}(C_b+C_{fb})s+1]$, or $V_{comp}=V_{Tx}[j2\pi f_s R_{comp}(C_b+C_{fb})+1]$. \qquad Equation 2

In equation 2, $R_{comp}$ is the resistance value of the resistive element 432. As $V_{Tx}=A_{Tx}\sin(2\pi f_s t)$; $V_{comp}=A_{Tx}\sin(2\pi f_s t)$ $[j2\pi f_s R_{comp}(c_b+C_{fb})+1]$. Defining $A_{comp}$ as $A_{comp}=A_{Tx}|j2\pi f_s R_{comp}(C_b+C_{fb})+1|$ simplifies the equation defining $V_{comp}$ to:

$V_{comp}=A_{comp}\sin(2\pi f_s t+\phi)$, \qquad Equation 3

Where $\phi$ is determined from $\phi=a\tan(2\pi F_s R_{comp}(C_b+C_{fb}))$.

In various embodiments; the value of $C_{fb}$ is set to mitigate effects due to interference coupled into the input device 400 through the input object 140. For example, the value of $C_{fb}$ is about 30 pF. In other embodiments, $C_{fb}$ may be greater than about 30 pF or less than about 30 pF.

The resistive element 432 may be configured to compensate for changes (e.g.; increases and decreases) in operational temperature. For example, the resistive element 432 may include a first resistor having a resistance that increases in response to an increase in temperature and a second resistor having a resistance that decreases in response to the increase in temperature. The resistive element 432 may include more than two resistors that have a variable resistance in response to change in temperature. Two or more of the resistors may have a similar variable resistance in response to a change in temperature and at least one of the resistors has a different variable resistance in response to the change in temperature. For example, two or more resistors increase in resistance in response to a change in temperature and one or more resistor decreases in resistance in response to the change in temperature. The resistors are coupled to in series and increase or decrease the resistance of the resistive element 432 in response to a change (e.g., an increase or decrease) in temperature such that operation of the operation of the baseline correction mechanism 430 is not significantly altered in response to a change in temperature. For example, in response to an increase or decrease of temperature, the amount of $C_b$ that baseline correction mechanism 430 compensates does not change by more than about ten percent.

FIG. 5 illustrates the resistive element 532, according to one or more embodiments. As illustrated; the resistive element 532 is a 10 bit R-DAC. For example, the resistive element 532 may be a resistor ladder having 10 rungs, e.g., rungs $b_0$-$b_9$. In other embodiments, the resistive element 532 may be an R-DAC having greater than a 10-bits or less than 10-bits. The resistance value of each resistor in the resistive element 532 may differ. The resistance values of the resistive element 532 may range from about 3 kilo ohms to about 15 kilo ohms. However, in other embodiments, resistance values less than about 3 kilo ohms and/or greater than about 15 kilo ohms may be utilized. In one embodiment, the resistance value of resistors increases from resistor R0 to resistor R9. The resistance of the resistive element 532 is selected by closing one or more of the switches coupled to the resistors R0-R9 and opening the other switches. For example, the resistance value of resistor R9 is selected by closing the switch coupled to the resistor R9 and opening the other switches. One or more of the resistors R0-R9 may be implemented with multiple resistors that compensate for changes in temperatures as is described above. The resistance element 432 of FIG. 4 may be implemented as the resistive, element 532.

Figure 6:
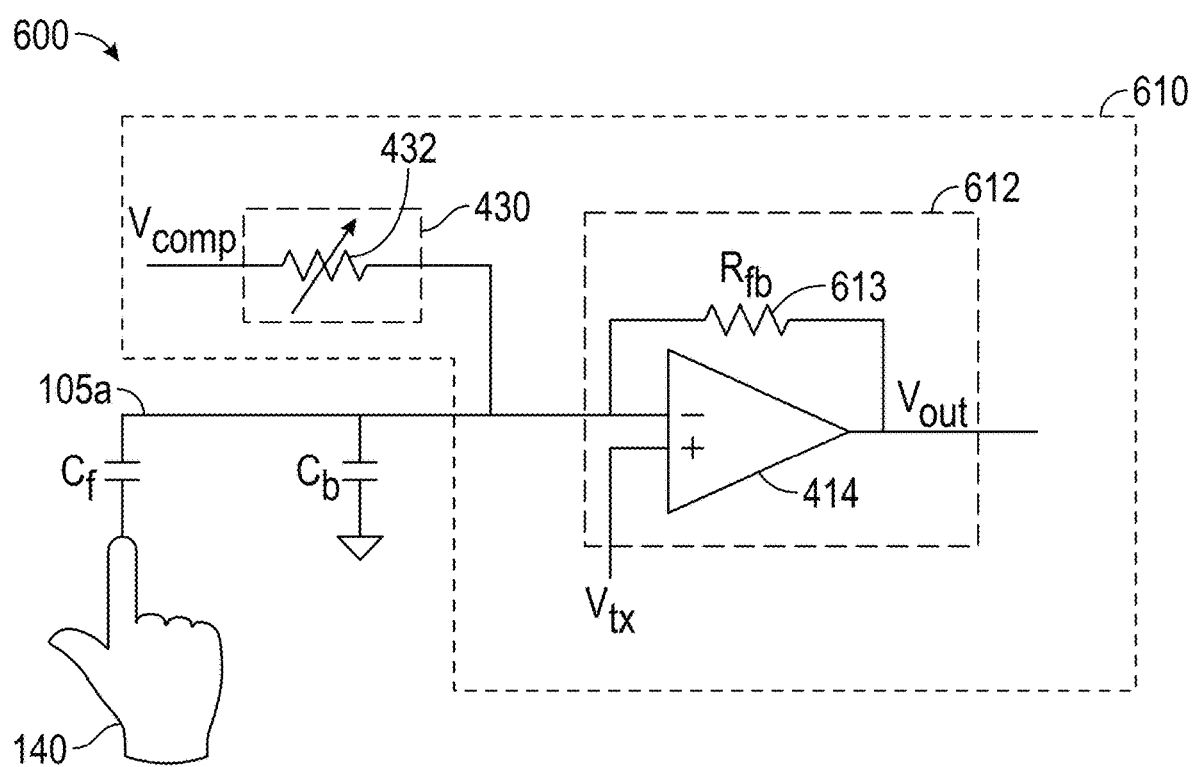
FIGS. 6 and 7 illustrate a portion of example input devices, according to one or more embodiments.

FIG. 6 illustrates a portion of an input device 600, according to one or more embodiments. The input device 600 comprises the processing system 610 and the sensor electrode 105a. The processing system 610 is configured similar to that of the processing system 110, and may replace the processing system 110 in the input device 100. The processing system 610 includes the baseline correction mechanism 430 and a receiver channel 612 of sensor circuitry (e.g., the sensor circuitry 112). As compared to the receiver channel 412 of FIG. 4, the receiver channel 612 of FIG. 6 includes a feedback resistor 613 having resistance R that is utilized instead of the feedback capacitor 416. By utilizing the feedback resistor 613 instead of the feedback capacitor 416, the circuitry size of the receiver channel 612 is reduced as compared to the circuitry size of the receiver channel 412. The feedback resistor 613 is coupled between an output of the operational amplifier 414 and an inverting input of the operational amplifier 414. $R_{fb}$ is about 26.5 kilo ohms. Alternatively, $R_{fb}$ is less than about 26.5 kilo ohms or greater than about 26.5 kilo ohms.

Figure 7:
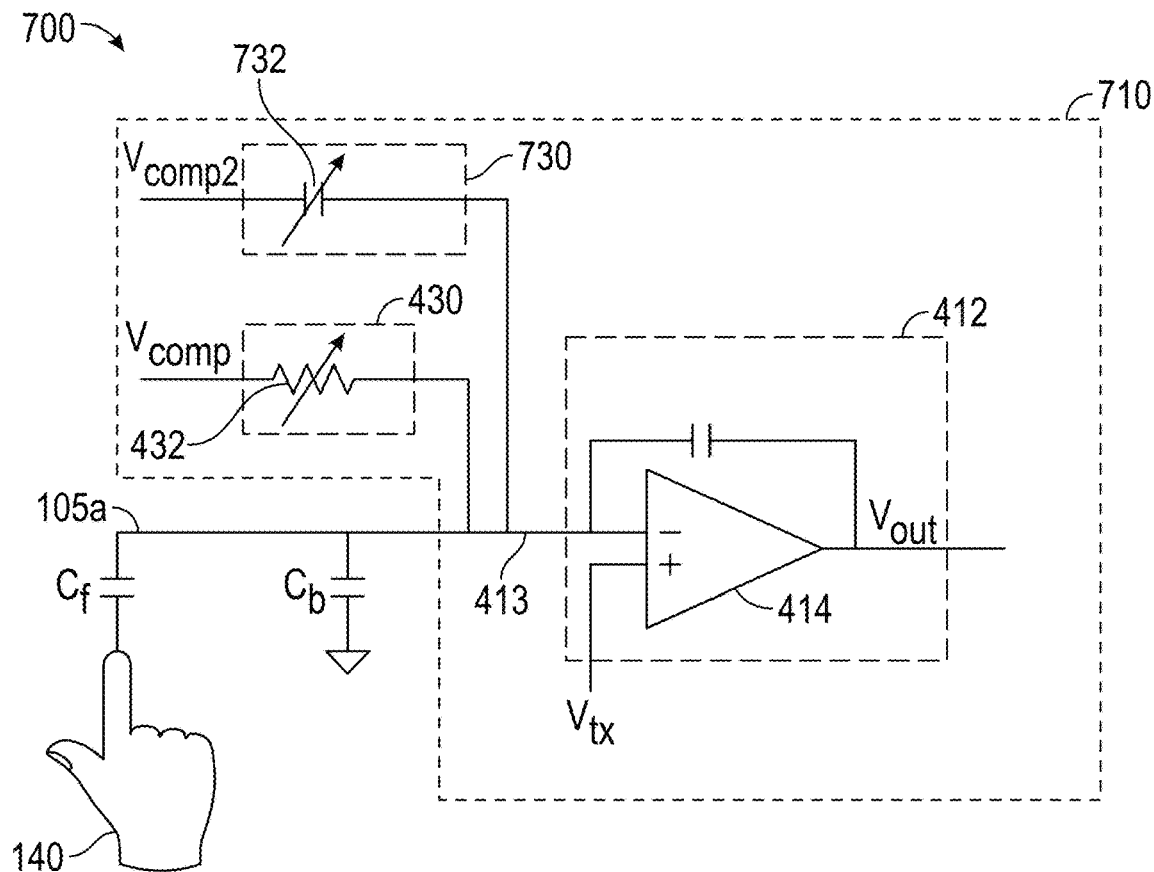

FIG. 7 illustrates a portion of an input device 700, according to one or more embodiments. The input device 700 comprises the processing system 710 and the sensor electrode 105a. The processing system 710 is configured similar to that of the processing system 110, and may replace the processing system 110 in the input device 100. The processing system 710 includes the baseline correction mechanism 430, a baseline correction mechanism 730 and a receiver channel 412 of sensor circuitry (e.g., the sensor circuitry 112). The baseline correction mechanism 730 includes a capacitive element 732 and is driven by $V_{comp2}$. $V_{comp2}$ is provided by a driver of the processing system 710 or external to the processing system 710.

The baseline correction mechanism 730 is coupled to the input 413 of the receiver channel 412. The frequency, peak-to-peak amplitude and/or phase of $V_{comp2}$ may the same as that of $V_{comp}$. Alternatively, the frequency, amplitude, and/or phase of $V_{comp2}$ may differ from that of $V_{comp}$. For example, the phase of $V_{comp2}$ may differ from the phase of $V_{comp}$. In one embodiment, $V_{comp}$ and the baseline correction mechanism 430 provides a larger amount of the baseline compensation than that provided by $V_{comp2}$ and the baseline correction mechanism 730. For example, the amount of compensation current provided by $V_{comp}$ and the baseline correction mechanism 430 is greater than the amount of compensation current provided by the $V_{comp2}$ and the baseline correction mechanism 730.

The capacitive element 732 is a non-variable or variable capacitive element. For example, the capacitive element 732 may include a capacitive DAC (C-DAC) that Includes two or more capacitors and corresponding switches that select the capacitors to generate the capacitance value of the capacitive element 732. The C-DAC may be a 4-bit C-DAC, However, in other embodiments, the C-DAC may be greater than a 4-bit C-DAC or less than a 4-bit C-DAC. The capacitance value of the capacitive element 732 is about 4 pF. Alternatively, the capacitance element 732 may be less than about 4 pF or greater than about 4 pF. The capacitive element 732 includes a range of capacitance values. For example, the capacitive element 732 includes a range of capacitance values of about 1 pF to about 5 pF. Alternatively, the range of capacitance values of the capacitive element 732 may include capacitance values less than pF and/or capacitance values greater than about 5 pF.

The baseline correction mechanism 430 may offset a first amount of background capacitance (e.g., mitigate a first portion of the background capacitance $C_b$) and the baseline correction mechanism 730 may offset a second amount of background capacitance (e.g., mitigate a second portion of the background capacitance Cu). The baseline correction mechanism 430 mitiaates a larger portion of the background capacitance $C_b$ than the baseline correction mechanism 730. The baseline correction mechanism 430 offsets an amount of background capacitance greater than offset by the second baseline correction mechanism 730.

The baseline correction mechanism 430 and the baseline correction mechanism 730 may be simultaneously driven by $V_{comp}$ and $V_{comp2}$ to offset the background capacitance $C_b$. Alternatively, the baseline correction mechanism 430 may be driven by $V_{comp}$ during a first period and the baseline correction mechanism 730 may be driven by $V_{comp2}$ during a second period that is non-overlapping with the first period.

Figure 8:
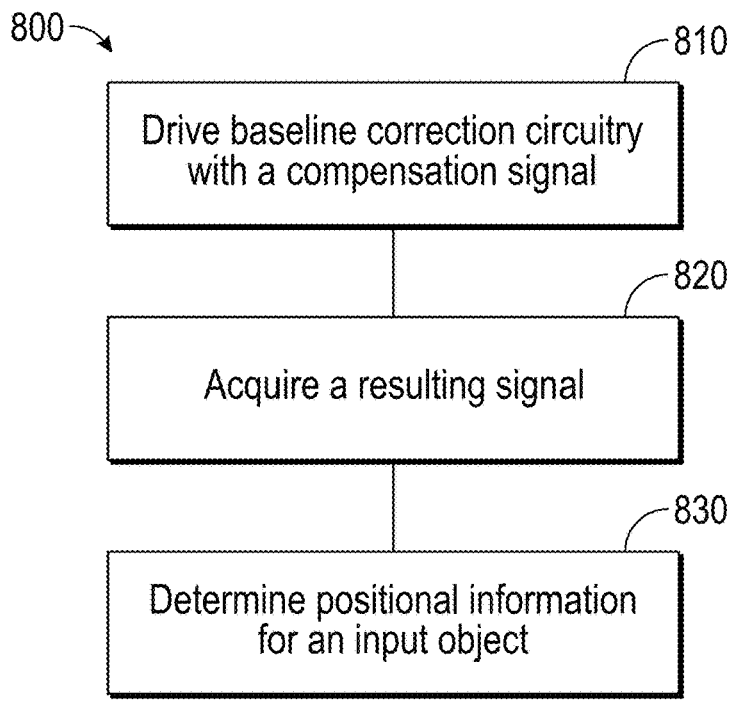
FIG. 8 is a flowchart of a method for performing capacitive sensing, according to one or more embodiments.

FIG. 8 illustrates a method 800 for operating an input device, according to one or more embodiments. At block 810, a baseline correction mechanism (e.g., 330 or 430) is driven with $V_{comp}$ to mitigate at least a portion of the background capacitance $C_b$ of the sensor electrode 105a during a first period. The background capacitance $C_b$ is formed between the sensor electrode 105a and a proximate conductive element. The proximate conductive element may be a display electrode (e.g., a data line 214, a gate line 216, a subpixel electrode 218, and/or cathode electrode 222) of a display panel (e.g., the display panel 210). The resistance of the resistive element (e.g., the resistive element 432) of the baseline correction mechanism (e.g., the baseline correction mechanism 430) may be adjusted to mitigate the background capacitance $C_b$. For example, the resistance of the resistive element may be increased or decreased to mitigate different amounts of background capacitance $C_b$. Optionally as at block 810, the baseline correction mechanism 730 may be driven by $V_{comp2}$. For example, the baseline correction mechanism 730 is driven by $V_{comp2}$ during a first period that at least partially overlaps a second period during which the baseline correction mechanism 330 or 430 is driven with $V_{comp1}$. The first and second periods are similar in length. Alternatively, the first period is shorter or longer than the second period. Further, the first period starts before or after the second period. Additionally, or alternatively, the first period ends before or after the second period. In one example, the baseline correction mechanism 730 is driven by $V_{comp2}$ and the baseline correction mechanism 330 or 430 is driven with $V_{comp1}$ simultaneously with each other.

At block 820, a resulting signal is acquired by the sensor circuitry 112. The resulting signal is acquired during the first period that at least partially overlaps with a period during which the background correction mechanism is driven with $V_{comp}$. The sensor electrode 105a is modulated by a receiver channel (e.g., the receiver channel 312, 412, or 612) of the sensor circuitry 112 to acquire the resulting signal. The resulting signal comprises effects corresponding to the background capacitance $C_b$ and the capacitance $C_f$ formed between the input object 140 and the sensor electrode 105a.

At block 830, the determination module 116 determines positional information for the input object 140 from the resulting signal. For example; the determination module 116 receives the resulting signal from the sensor circuitry 112 and processes the resulting signal to determine a change in capacitive coupling of the sensor electrodes 105a. The determination module 116 utilizes the change in capacitive coupling of the sensor electrode 105a to determine a measurement of the change in capacitive coupling of the sensor electrode 105a, and determines positional information for the input object 140 from the measurement of the change in capacitive coupling of the sensor electrode 105a.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

What is claimed is:
1. A processing system comprising:
sensor circuitry comprising a first receiver channel coupled to a first sensor electrode and having an input configured to acquire a first resulting signal from the first sensor electrode, wherein a first background capacitance is formed between the first sensor electrode and a conductive element, and wherein the sensor circuitry modulates the first sensor electrode with a sensing signal to acquire the first resulting signal; and
a first baseline correction mechanism coupled to the input of the first receiver channel, the first baseline correction mechanism comprising a first resistive element configured to be driven with a first compensation signal to at least partially mitigate the first background capacitance, wherein a phase of the first compensation signal differs from a phase of the sensing signal.

2. The processing system of claim 1, wherein a frequency of the first compensation signal is substantially similar to a frequency of the sensing signal.

3. The processing system of claim 1, wherein the first resistive element is a variable resistive element.

4. The processing system of claim 3, wherein the variable resistive element comprises a resistor ladder having a plurality of selectable resistors.

5. The processing system of claim 1 further comprising a second baseline correction mechanism coupled to the input of the first receiver channel, the second baseline correction mechanism comprising a capacitive element.

6. The processing system of claim 1, wherein the sensor circuitry further comprises a second receiver channel configured to acquire a second resulting signal from a second sensor electrode, and wherein the processing system further comprises a second baseline correction mechanism coupled to an input of the second receiver channel.

7. The processing system of claim 1, wherein the first receiver channel comprises an integrator and a feedback resistor coupled between an output of the integrator and an inverting input of the integrator.

8. An input device comprising:
a first sensor electrode;
a conductive element; and
a processing system comprising:
sensor circuitry comprising a first receiver channel coupled to the first sensor electrode and having an input configured to acquire a first resulting signal from the first sensor electrode, wherein a first background capacitance is formed between the first sensor electrode and the conductive element, and wherein the sensor circuitry modulates the first sensor electrode with a sensing signal to acquire the first resulting; and
a first baseline correction mechanism coupled to the input of the first receiver channel, the first baseline correction mechanism comprising a first resistive element configured to be driven with a first compensation signal to at least partially mitigate the first background capacitance, wherein a phase of the first compensation signal differs from a phase of the sensing signal.

9. The input device of claim 8, wherein a frequency of the first compensation signal is substantially similar to a frequency of the sensing signal.

10. The input device of claim 8, wherein the first resistive element is a variable resistive element.

11. The input device of claim 10, wherein the variable resistive element comprises a resistor ladder having a plurality of selectable resistors.

12. The input device of claim 8, wherein the processing system further comprises a second baseline correction mechanism coupled to the input of the first receiver channel, the second baseline correction mechanism comprising a capacitive element.

13. The input device of claim 8 further comprising a second sensor electrode, wherein the sensor circuitry further comprises a second receiver channel configured to acquire a second resulting signal from the second sensor electrode, and wherein the processing system further comprises a second baseline correction mechanism coupled to an input of the second receiver channel.

14. A method for operating a sensing device, the method comprising:
driving, during a first period, a resistive element of a first baseline correction mechanism with a first compensation signal to mitigate a background capacitance between a sensor electrode and a conductive element, the first baseline correction mechanism is coupled to an input of a receiver channel of sensor circuitry, wherein the receiver channel is coupled to the sensor electrode;
modulating, during the first period, the sensor electrode with a sensing signal, wherein a phase of the first compensation signal differs from a phase of the sensing signal;
acquiring, during the first period, a resulting signal from the sensor electrode with the receiver channel; and
determining positional information for an input object based on the resulting signal.

15. The method of claim 14, wherein the first compensation signal is substantially similar to a frequency of the sensing signal.

16. The method of claim 14, wherein the resistive element is a variable resistive element.

17. The method of claim 14 further comprising driving, during the first period, a capacitive element of a second baseline correction mechanism with a second compensation signal, the second baseline correction mechanism is coupled to the input of the receiver channel.

* * * * *